United States Patent [19]

Reinhart, Jr.

[11] 4,381,363

[45] Apr. 26, 1983

[54] CURE RETARDING ADDITIVES FOR ACETYLENE-TERMINATED POLYMERS

[75] Inventor: Theodore J. Reinhart, Jr., Dayton, Ohio

[73] Assignee: The United States of America as represented by the Secretary of the Air Force, Washington, D.C.

[21] Appl. No.: 300,838

[22] Filed: Sep. 10, 1981

[51] Int. Cl.³ .................. C08G 73/10; C08G 73/12
[52] U.S. Cl. ............................ 524/324; 524/325; 524/336; 524/338; 524/347; 524/550; 524/592; 524/600; 526/259; 526/285; 528/125; 528/128
[58] Field of Search ............... 528/125, 177, 128; 525/6; 526/259, 285; 524/324, 325, 336, 338, 347, 350, 592, 600

[56] References Cited

U.S. PATENT DOCUMENTS

| | | |
|---|---|---|
| 3,845,018 | 10/1974 | Bilow et al. ............... 528/178 |
| 3,864,309 | 2/1975 | Bilow et al. ............... 528/178 |
| 3,897,395 | 7/1975 | D'Alelio ................... 528/178 |
| 4,098,767 | 7/1978 | Bilow ....................... 528/178 |
| 4,147,868 | 4/1979 | Arnold et al. ............ 544/353 |
| 4,187,359 | 2/1980 | Picklesimer .............. 525/6 |

Primary Examiner—Lester L. Lee
Attorney, Agent, or Firm—Donald J. Singer; William J. O'Brien

[57] ABSTRACT

A polymeric composition comprised of a mixture of an acetylene-terminated polymer and an hydroxy-substituted, polynuclear, aromatic derivative as a cure retarding additive.

8 Claims, No Drawings

CURE RETARDING ADDITIVES FOR ACETYLENE-TERMINATED POLYMERS

STATEMENT OF GOVERNMENT INTEREST

The invention described herein may be manufactured and used by or for the Government for governmental purposes without the payment of any royalty thereon.

BACKGROUND OF THE INVENTION

This invention relates to acetylene-terminated oligomeric and polymeric compositions and to a method for facilitating and improving the processing of such compositions. In a more particular aspect, this invention relates to additive materials for use in aiding and improving the processing characteristics of acetylene-terminated oligomers and polymers.

At the present time, considerable interest has evolved in the development of polymeric materials characterized by high strength and elevated temperature stability. Materials which possess these characteristics are especially useful as matrix resins in the fabrication of structural composites and molded components; as high strength adhesives for structurally bonded joints; and as laminating resins in the production of high strength laminates. Among the materials found to possess these desired properties are acetylene-terminated oligomers and polymers. Unfortunately, these polymers are difficult to process and the resulting processed products do not possess the degree of toughness required to withstand the severe stresses and strains which exist within the operational environment of present day aerospace vehicles and systems.

In an attempt to overcome the problems encountered heretofore in using acetylene-terminated oligomers and polymers, it was found that the use of hydroxy-substituted polynuclear, aromatic derivatives as cure retarding additives for the polymers provided an easy processing, highly mobile (low viscosity melt) polymer with an enhanced performance capability when used in adhesive, matrix, or laminating applications. The unexpected increase in performance capability of the polymers of this invention is attributed to the fact that the resins possess improved melting characteristics and a broader processing tolerance. Also, the additives allow for a controlled cross-link density, thus providing a means for formulating a tougher and more fracture resistant polymeric material.

SUMMARY OF THE INVENTION

In accordance with the present invention, it has been found that the addition of a hydroxy-substituted, polynuclear, aromatic compound to an acetylene-terminated polymer, as a cure retarding or processing additive, reduces significantly the melt viscosity of the polymer during its curing cycle thereby prolonging the melt state of the molten material to allow for easy processing. The use of the processing additives of this invention, such as 1-napthol, 2-napthol, chlorohydroquinone, monohydroxyanthraquinone, dihydroxythraquinone and dihydroxynaphthalene, in amounts of from about one to twenty weight percent, solve the processing problems caused by the high melt viscosity of previously used acetylene-terminated polymers. Also, the use of the additives of this invention, especially with acetylene-terminated polyimides, allows the rather high level of cross-linking to be reduced in a controlled manner to produce a more fracture resistant, cured polymer.

Accordingly, the primary object of this invention is to provide acetylene-terminated oligomeric and polymeric materials that demonstrate an enhanced capability for use in the fabrication of a variety of structural elements for aerospace systems.

Another object of this invention is to provide acetylene-terminated polymers that are easily processed and exhibit a high degree of fracture resistance when used as matrix resins, as adhesives for structurally bonded joints, and for laminating applications.

Still another object of this invention is to provide a processing and cure retarding additive for use with acetylene-terminated polyimide oligomers and polymers.

The above and still further objects and advantages of the present invention will become more readily apparent upon consideration of the following detailed disclosure thereof.

DESCRIPTION OF THE PREFERRED EMBODIMENT

Pursuant to the above-defined objects, it has been found that the addition of hydroxy-substituted, polynuclear, aromatic compounds to acetylene-terminated polymers, in amounts ranging from about one to 20 weight percent, significantly reduces the high melt viscosity of such polymers. Reducing melt viscosity during the cure cycle promotes wetting of particular or fibrous fillers, of metallic or composite adherends, as well as prolonging the melt state of the molten material to allow for easy processing of very thick or large area components.

The specific additive materials contemplated by the invention are shown in Table I along with their structural formula.

TABLE I

| No. | Cure Retardant | Structural formula |
| --- | --- | --- |
| 1. | 1-napthol | OH |
| 2. | 2-napthol | OH |
| 3. | 1,4-napthalenediol | OH, OH |
| 4. | 1,2-napthalenediol | OH, OH |
| 5. | 1,3-napthalenediol | OH, OH |
| 6. | 1,5-napthalenediol | OH, OH |

| No. | Cure Retardant | Structural formula |
|---|---|---|
| 7. | 1-hydroxyanthraquinone | |
| 8. | 2-hydroxyanthraquinone | |
| 9. | 1,2-dihydroxyanthraquinone (alizarin) | |
| 10. | 2-chloro-1,4-dihydroxybenzene (adurol) | |

TABLE I-continued

The addition of any one of the cure retarding additives shown in Table I to curable acetylene-terminated polymers, such as thermid 600, an acetylene-terminated polyimide, in amounts of from about one to 20 percent by weight, cause the polymer melt viscosity to be reduced very significantly during cure compared to the curing of a T600 resin without the additives. The additive causes the molten polymer to wet very thoroughly any materials that it comes into contact. The monohydroxy-substituted materials also reduce the cross-link density of the T600 polymer, thus acting as a reactive plasticizer or toughening agent to produce tougher cross-linked polymers. The addition of the dihydroxy-substituted materials, such as chlorohydroquinone, dihydroxynaphthalenes and dihydroxyanthraquinone in amounts of from one to 20 percent by weight very significantly prolong the period during which the polymer remains in the liquid state prior to cure. Without the dihydroxy additives, the polymer is molten for about 60 seconds at 480° F. With the additive, the molten state is maintained for over 10 minutes prior to gelation and cure at 480° F. This provides a material having a much broader processing tolerance compared to the unmodified material. Also, the other homologs of 1,2-dihydroxyanthraquinone can be used with equal effectiveness. Their use, however, is not deemed practical because of their high cost and lack of ready availability.

In order to illustrate the invention with greater particularity and demonstrate how it may be carried into effect, Thermid 600 was mixed with one percent, 5 percent, 10 percent and 20 percent by weight, respectively, with each of the hydroxy-substituted, polynuclear, aromatic compounds of Table I. Thermid 600 is an acetylene-terminated polyimide resin from the Gulf Chemical Corporation (Thermid MC-600) having the following structural formula.

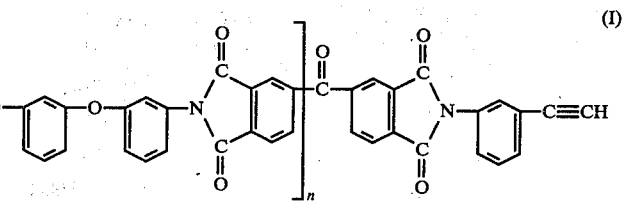

where n is 1 or 2

Acetylene-terminated polymide oligomers and polymers of the type illustrated by structural formula (I) are well known in the literature. Although the present invention is applicable to acetylene-terminated polymers in general, it is more desirable to use the oligomer defined by structural formula (I). These oligomers can be prepared according to the teachings of Bilow et al in U.S. Pat. Nos. 3,845,018, 3,864,309 and 3,879,349.

The various one, 5, 10 and 20 percent mixtures referred to above, were mixed and ground in a mortar to form an intimate uniform mixture. The mixtures so obtained were melted on a hot plate preheated to 480°. The time to melt, total time in molten state and visual estimation of viscosity as a function of time were then recorded and compared to Thermid 600 along with the following results.

The pure Thermid 600 exhibited a 5-second melt time, a total of 3 minutes flow time, poor wetting of the plate and spatula, and maintained a viscosity close to that of 30 w oil. The Thermid 600 modified with the 1-napthol and 2-napthol additives displayed no change in time to melt, but the melt viscosity was extremely low (approximately like a 5 w oil) and the molten material wet the hot-plate and the stirring spatula extremely well. In addition, after cure, the polymer was tough and not brittle like the unmodified T-600.

The Thermid 600 modified with the naphthalenediol and hydroxyanthraquinone additive displayed the same melt time as the unmodified Thermid 600, and about the same melt viscosity; however, the time in the molten state was increased from 3 minutes for the unmodified T600 to over 10 minutes for the modified T600.

Various mixtures of compounds, such as Nos. 2 and 3, 2 and 9, 1 and 3, 1 and 9, 2 and 4 and 1, 2 and 9 of Table I, when added to T600 in amounts of 1%, 5%, and 20% by weight, produced materials which displayed extremely low-melt viscosities, 10 minutes and longer liquid times at 480° F., and cured polymers that were tough and strong and not brittle.

Additional tests of the cure retarding additives of this invention were conducted at 490° F. in order to determine their relative reactivity and effectiveness. The additives were added in amounts of 10 percent by weight and the results are recorded in Table II as follows.

TABLE II

| DELAY IN GELTIME OF T-600 at 490° F. | | |
|---|---|---|
| | GEL | SET |
| T-600 Unmodified | 2 min, 5 sec | 12 min, 55 sec |
| T-600 + Chlorohydroquinone | 3 min, 45 sec | 21 min, 36 sec |
| T-600 + Hydroxy-anthraquinone | 2 min, 15 sec | 20 min, 5 sec |

TABLE II-continued

| DELAY IN GELTIME OF T-600 at 490° F. | | |
| --- | --- | --- |
| | GEL | SET |
| T-600 + Anthraquinone | 2+ min, 15 sec | 22+ min, 30 sec |
| T-600 + 2-Napthol | 4 min, 20 sec | 25 min, 18 sec |

From a consideration of the foregoing, it can be seen that the present invention provides a simple, efficient and economic method for overcoming the processing problems commonly associated with the use of acetylene-terminated type oligomers and polymers. The additives of this invention provide an easy processing, low viscosity polymer that has an enhanced performance capability when used as an adhesive or as a matrix or laminating resin. It has been found to be particularly useful as a structural material in the fabrication of high performance graphite fiber reinforced composites and as adhesives for bonding structural joints utilizing acetylene-terminated polymers as base matrix materials.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. A curable polymeric composition composed of a mixture of a major amount of an acetylene-terminated polymeric resin and a minor amount of a cure retarding additive selected from the group consisting of napthol, napthalenediol, monohydroxyanthraquinone, dihydroxyanthraquinone and 2-chloro-1, 4-dihydroxybenzene.

2. A polymeric composition as defined in claim 1 wherein said resin is an acetylene-terminated polyimide.

3. A polymeric composition as defined in claim 2 wherein said resin is an acetylene-terminated polyimide resin having the following structural formula

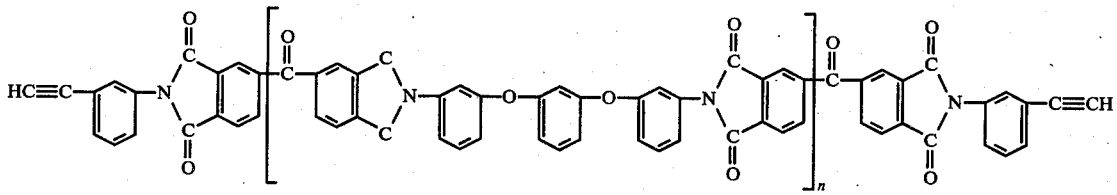

where n is an integer of 1 or 2.

4. A polymeric composition as defined in claims 1, 2, or 3 wherein said cure retarding additive is napthol.

5. A polymeric composition as defined in claims 1, 2 or 3 wherein the cure retarding additive is napthalenediol.

6. A polymeric composition as defined in claims 1, 2 or 3 wherein said cure retarding additive is monohydroxyanthraquinone.

7. A polymeric composition as defined in claims 1, 2 or 3 wherein said cure retarding additive is dihydroxyanthraquinone.

8. A polymeric composition as defined in claims 1, 2 or 3 wherein said cure retarding additive is 2-chloro-1, 4-dihydroxybenzene.